United States Patent [19]

Da Dalt

[11] 4,155,290

[45] May 22, 1979

[54] VINIFICATION VAT

[76] Inventor: Gino Da Dalt, Viale Gorizia, 16/B, Conegliano, Provincia di Treviso, Italy

[21] Appl. No.: 866,898

[22] Filed: Jan. 4, 1978

[51] Int. Cl.² .............................................. C12C 1/00
[52] U.S. Cl. .................................. 99/277.2; 366/219
[58] Field of Search .................... 366/44, 45, 47, 219, 366/278, 144, 148, 149, 239, 240, 237; 99/277.2, 276, 277, 277.1

[56] References Cited

U.S. PATENT DOCUMENTS

| | | | |
|---|---|---|---|
| 2,013,359 | 9/1935 | Paris | 366/45 |
| 2,273,750 | 2/1942 | Clagett | 366/44 |

Primary Examiner—Robert W. Jenkins
Attorney, Agent, or Firm—Guido Modiano; Albert Josif

[57] ABSTRACT

A vinification vat comprises a substantially elongate container provided with a load and discharging mouth formed in a head thereof and a support member engaging the head such as to enable the container to perform both rotational movements about its main axis and oscillatory movements in a vertical plane.

11 Claims, 1 Drawing Figure

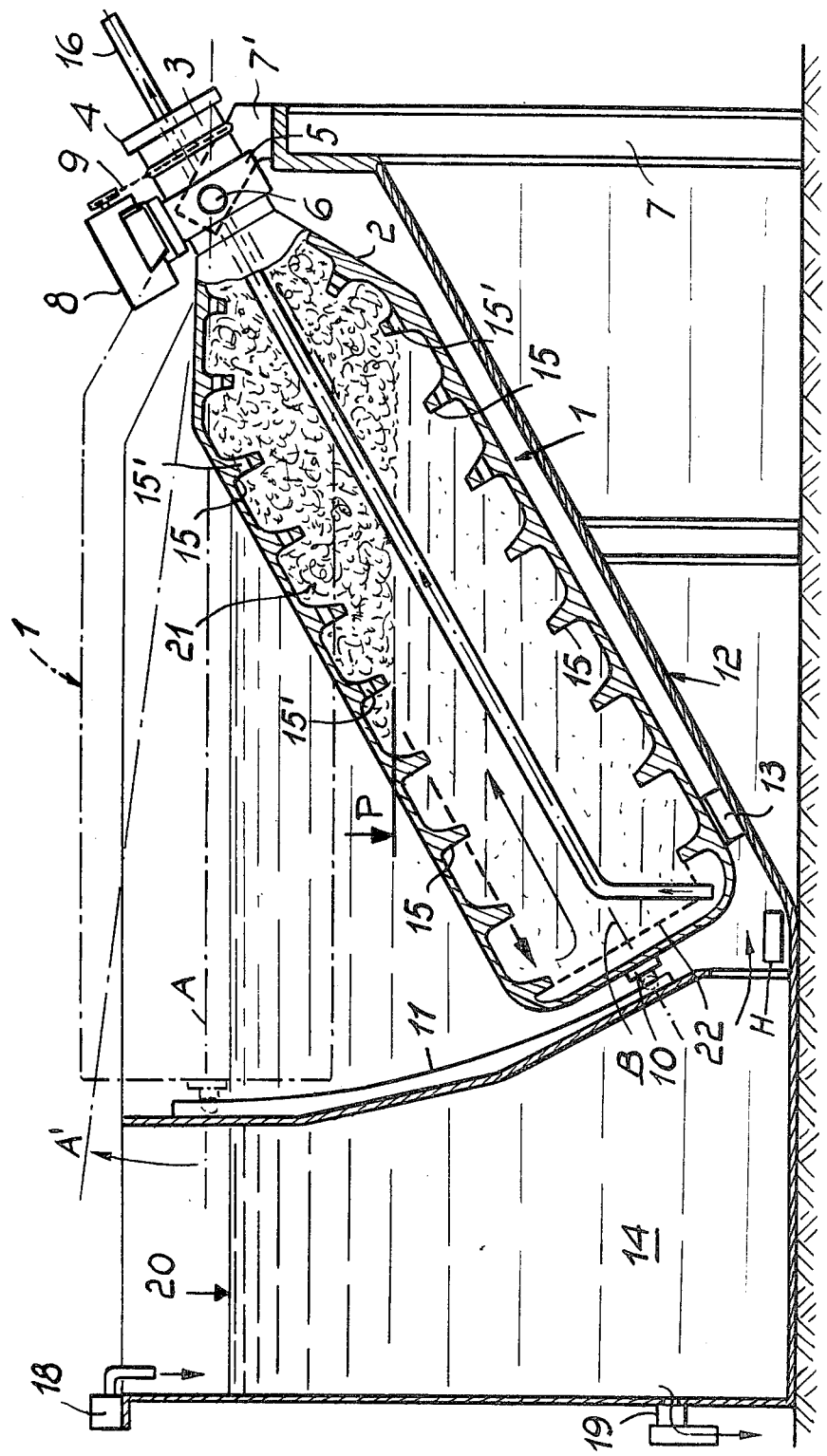

VINIFICATION VAT

BACKGROUND OF THE INVENTION

This invention relates to a novel vinification vat, which constitutes a suitable alternative to any prior art wine-making systems currently in existence.

The vinification or wine-making systems employed heretofore consist of a stationary vat or large tub, wherein the grape-husks are recycled through the must. Such recycling is usually carried out either with the aid of mechanical mixing apparata or by continuously circulating grape-husks which are drawn, by suction, from the vat, and returned thereto through a suitable circulation circuit. On completion of the vinification process, the wine is recovered in various ways: e.g. by draining, or again by suction through a drawing duct. In either cases, the subsequent emptying of the grape-husks requires a specific step, and the use of suitable means to be installaed and operated separately.

In actual practice, the cited prior techniques involve comparatively complicated devices, and moreover, the various steps and operations require the availability of specific separate equipment.

SUMMARY OF THE INVENTION

It is an object of this invention to provide a novel vinification vat of a simpler construction and easier to operate than the vats currently employed, while capable of performing all of the operations involved in wine-making with improved results.

This object is achieved by the vinification vat according to this invention, which is characterized in that it comprises: a substantially elongate container, a loading and discharging mouth formed in a head of said container, a supporting means engaging said head such as to enable said container to perform both rotational movements about its main axis and oscillatory movements in a vertical plane, and a control means for controlling said movements.

BRIEF DESCRIPTION OF THE DRAWINGS

Further features and advantages will become apparent from the ensueing description and accompanying drawing, the one FIGURE whereof illustrates schematically the inventive vat in its entirety.

DESCRIPTION OF THE PREFERRED EMBODIMENTS

With reference to the drawing FIGURE, a vat 1 according to this invention, having any desired shape and cross-sectional configuration—although a cylindrical shape is the preferred one, is a container of varied capacity, suitably elongated, which on a head exhibits a conical taper 2 which extends into a cylindrical neck 3 and terminates in a single loading and discharging mouth 4. The neck outside is provided with a rigidly mounted band 5 which engages pivotally, through a substantially horizontal pivot pin 6, with a yoke 7' rigid with a supporting upright 7. It will be appreciated that, as visible in the drawing, the pivot pin 6 extends perpendicular to the longitudinal axis of the container and defines a hinged connection between the yoke 7' and the container 1. By virtue of this articulation, the vat is enabled to perform oscillatory movements in a vertical plane and angular movements about the pin between two positions: a position A on a substantially horizontal plane, and a position B on an inclined plane sloping downward.

The neck band 5 has a motor-reduction gear combination 8 installed thereon, which through a belt drive means 9—or other similar drive—drives the vat 1 to slowly revolve about itself. Obviously, a frictionless bearing is provided between the neck 3 and band 5. The vat rotation, however, is maintained through any angular position wherein the vat may set itself, as well as during the angular displacement thereof. To guide said angular movement, the vat bottom is provided with a frictionless shoe 10 which slides along an arcuate surface forming a reaction guide 11. Said angular displacement is due to gravity, and is thus natural and a function of weight. The installation just described is made in a tank 12 to be filled with water or a liquid providing the same operational results. With the vat empty (tare weight only), the liquid supports the vat, or keeps it afloat, in the substantially horizontal position A; thereafter, as it becomes filled with the mass to be vinified, it sinks into the water proportionally to its weight until, under full load, it reaches a predetermined oblique or slanted operating position. During the sinking step, in order to prevent the tank liquid from overflowing, this is drained to an auxiliary or surge tank 14, communicating to the tank which accomodates the vat. During the contents discharge step, the vat, as it loses weight, is automatically and progressively returned to the horizontal position A.

Along the entire inside cylindrical surface of the vat and up to the level defined by the mouth 4, a continuous helical blade or auger 15, having varying pitch, height and inclination as convenient, is welded or formed by any specific manufacturing method. The inclined blade surface of this auger serves to convey toward the vat bottom a mass present therein when rotated in one direction, and to convey it toward the mouth, for withdrawal, when rotated in the opposite direction, regardless of the angular floating position. However, to facilitate the discharge operation, in view of the plane P of grape-husks build up, as indicated at 21, tending to horizontality, the vat can be set with its mouth below the level of the pivot pin, i.e. on an inclined plane A' tending to allow the contents naturally out, for as long as required. It will be apparent that this plane will depend on an increased level of the liquid 20, to be controlled through any suitable loading means 18 and discharging means 19 (either automatic or not). Furthermore, according to the invention, provision is made, inside the vat or container 1, for holes 15' at the auger, a duct 16 leading from the mouth 4, a bottom filter 22, the functions of which components will be explained hereinafter.

A heater H may be provided inside the tank 12 to control the temperature of the liquid.

The device operates as follows, in an intermittent vinification cycle mode.

Loading: with the vat, either rotating or not, in the horizontal position A, the pressed mass is introduced thereinto with conventional means, thereby the vat gradually leans over and sinks in proportion to the weight of said mass. It may even fail to attain its maximum inclination (B), if the load is short of the permissible maximum. The auger conveys the grape-husks 21 toward the bottom. The grape-husks 21 are admixed to the must and tend to move upward, to float over the must, but in collecting toward the top of the vat are again caught by the auger, in a continuous cycle. At its leading section, toward the mouth 3, the auger 15 may be formed with holes 15' in several locations for dripping purposes and the possible recovery of the must-wine residue.

Discharging: on completion of the process, the contents can be discharged by either withdrawing only the must-wine through a pre-installed duct 16, by suction, to withdraw the must from an interspace area separated by a bottom filter 22; or the discharge may be carried out by withdrawing the grape-husks alone, through rotation of the vat in the opposite direction, by virtue of the auger conveying them toward the mouth; or both can be withdrawn simultaneously, as previously described. During the discharge operation, the vat gradually achieves a position (A) of horizontal floating trim, and beyond (A'). Specially important, however, is the fact that, by making available a tank of suitable construction, the vat can be brought to these planes (A and A') even under full load, by the addition of fresh flotation liquid.

In view of the auger action, even during the recycling or loading steps, the grape-husks may be forcibly raised by reciprocating the rotation of the vat; in the latter case, for example, in order to admix the pressed grape to a must either left over from a previous cycle or introduced at a later time.

In the instance of a continuous vinification cycle mode, the device is operated as follows. The vat is rotated while being fed; the pressed mass tends to separate, according to specific gravity and/or owing to fermentation, from the liquid phase. The continuous extraction of the latter is effected by suction through the drawing duct 16; the solid phase being extracted by reversing the vat direction of rotation, for direct transfer to successive processing steps.

A substantial dissimilarity exists between the cited conventional systems and the system according to this invention. It is this dissimilarity that, in a broader sense, epitomizes all of the numerous features making up the ensemble of the instant inventive concept. The vinification vat is not stationary or fixed, but rather movable, i.e. rotatable about itself as well as tiltable about a bearing pivot pin; it floats on water or other suitable liquid during the entire vinification process; therefore, the thickness of its metal plates can be appreciably reduced, to result in a suitably low cost; it does not complicate, nor does it alter, but rather simplifies the vinification in the continuous mode; the loading of the pressed mass and the discharging thereof on completion of the vinification are carried out through a single mouth opening; it does without any arrangements for stirring the grape-husks because the same are recycled by means of its rotational movement; the emptying of the digested grape-husks exhausted is also effected through said rotational movement.

The main advantage afforded by such constructional and operational characteristics may be summarized as follows:

(1) There is no need any more to set up or adjust devices for actuating the individual steps of the vinification process.

(2) The fermentation can be carried out at a controlled temperature (conditioning), since it is the very liquid whereon the vat is afloat which establishes it, as it established, in the end, also the temperature for the process of thermovinification.

(3) The vat loading and discharging are carried out through a means which is connected to the outside, thereby the vinification can be carried out either in the intermittent or continuous modes. The latter provides for the following alternatives: continuous loading of the pressed mass with continuous withdrawal either of the wine alone, or of the grape-husks alone, or of both at one and the same time.

(4) The grape-husks ejected out of the vat can be conveyed directly to the pressing step or other conventional processing steps.

The vat and related system being based upon a novel operation principle, obviously lend themselves to such modifications as the practicing of this invention may suggest. For example, the liquid in the tank 12 may be conditioned to a given temperature by means of heating devices (or colling devices) of conventional design, which would allow vinification at an optimal temperature according to the nature of the various musts, or continuous or intermittent vinification, as desired.

Thus, the preceding description cannot be construed as a limitation to the invention, being only an exemplary embodiment thereof which finds its scope in the appended claims.

I claim:

1. A vinification vat device, comprising a movable container having a longitudinal axis, a head on one end thereof defining a vinification matter loading and discharging mouth for the container and a bottom end remote from said head, supporting means for said container allowing oscillation of said container about another axis arranged near said head and perpendicular to said longitudinal axis, guide means for guiding the movement of said container, a tank for a liquid to be contained therein, said container being arranged within said tank to be at least partially immersed in said liquid.

2. A device according to claim 1 wherein said supporting means include bearing means allowing in addition a rotatory movement of said container about said longitudinal axis.

3. A device according to claim 1 wherein said supporting means include a yoke and hinge means cooperating with said yoke to allow oscillation of said container from a position in which said bottom end thereof is lower than said head into a position in which said bottom end is at a level higher than that of said head.

4. A device according to claim 1, wherein the weight of said container, the density of said liquid and the filling degree of said container with vinification matter contained therein are selected so that said container with the content thereof floats within said liquid and the position of the container is controlled by the liquid level within said tank.

5. A device according to claim 1 wherein the weight of said container, the density of said liquid and the filling degree of said container with the vinification matter contained therein are selected so that said container with the content thereof sinks within said liquid.

6. A device according to claim 1, wherein said tank has heating means for controlling the temperature of said liquid contained therein.

7. A device according to claim 1, further comprising a surge tank adjacent said tank and communicating therewith to allow the liquid level in the two tanks to be balanced, said surge tank having means for feeding and discharging liquid thereto.

8. A device according to claim 1, wherein said supporting means comprise, an upright structure, a yoke fixed onto said upright structure, a band surrounding the head of said container and coaxial with said longitudinal axis thereof, bearing means allowing rotation of said band about said head around said longitudinal axis while at the same time supporting said container at said head thereof, hinge means on said band and said yoke for allowing hinged connection therebetween, said hinge means having pivot means extending perpendicular to said longitudinal axis to allow rotation of said band and said container thereabout with respect to said yoke.

9. A device according to claim 1, further comprising a reducing gear drive adjacent said band and in transmission engegement therewith to impart rotatory movement thereto.

10. A device according to claim 1, wherein said guide means comprise guide member rigid with said tank and adjacent said bottom end of the container and extending along the path of said bottom end during oscillation of said container about said another axis thereof, a sliding shoe member rigid with said bottom end of the container and in sliding engagement with said guide member and stop means for defining end positions of the oscillating movement of said container.

11. A device according to claim 1, further comprising auger means within said container for mixing and moving the vinification matter contained therein and pipe and filter means within said container for extraction of liquid phase vinification matter contained therein.

* * * * *